United States Patent Office 2,916,513
Patented Dec. 8, 1959

2,916,513

PRODUCTION OF ACRYLIC ACID AND ITS ESTERS

Hans Lautenschlager, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Application July 2, 1957
Serial No. 669,447

Claims priority, application Germany July 5, 1956

8 Claims. (Cl. 260—486)

This invention relates to an improved process for the production of acrylic acid and its esters by reaction of acetylene, carbon monoxide and water or alcohols in the presence of a catalyst. In particular the invention relates to a process for the production of acrylic acid and its esters in the presence of new catalysts.

It is already known to prepare acrylic acid or its derivatives by reacting carbon monoxide with acetylene and water or with other compounds containing reactive hydrogen atoms, as for example alcohols, carboxylic acids, primary or secondary amines, in the presence of carbonyl-forming metals or their compounds, especially nickel halides, while heating and under pressure. It is also already known to use as catalysts for this reaction complex compounds of nickel which, in addition to halogen, contain phosphonium arsonium or stibonium compounds. Furthermore it is already known to use as catalysts complex nickel compounds which contain tertiary amines or ammonium compounds derived therefrom. It has also already been proposed to carry out the reaction of acetylene, carbon monoxide and compounds with replaceable hydrogen atoms in the presence of complex compounds of nickel salts with carboxylic acid amides. Furthermore it has also already been proposed to prepare acrylic acid and its functional derivatives from acetylene, carbon monoxide and water or compounds with replaceable hydrogen atoms in the presence of catalysts at elevated temperature and under pressure by using as catalysts complex compounds of halides or carbonylforming metals and complex-forming compounds of the general formula X—CH$_2$—(CH$_2$)$_n$—Y which contain two elements of the 5th and/or 6th main group of the periodic system. In the said formula, X and Y represent a hydroxy, alkoxy, aryloxy or acyl group or a radical of a primary or secondary amine, phosphine, arsine or stibine and $n$ has the value, 0, 1 or 2.

It is an object of the present invention to increase the speed of reaction in the known methods for the synthesis of acrylic acid and its esters by the use of new catalysts. A further object of the invention consists in carrying out the reaction in the shortest possible reaction times without changing the yields of acrylic acid or its esters, i.e. to achieve a better space-time yield. We have now found that the synthesis of acrylic acid and its esters from acetylene, carbon monoxide and water or alcohols in the presence of catalysts and at elevated temperature and under pressure can be carried out especially advantageously by using as a catalyst a complex compound which contains a nickel halide and a complex-forming compound of the general formula X—CH$_2$—(CH$_2$)$_n$—Y which contains two elements of the 5th and/or 6th main groups of the periodic system, in which X is a nitrile, imino ether or acid amide group and Y is a nitrile, iminoether, acid amide, hydroxy, alkoxy, aryloxy or acyl group or a corresponding sulphur or sulphur-containing group or the radical of a primary or secondary amine and $n$ has the value 0 to 5.

Suitable organic complex-forming compounds which are used together with nickel halides are for example malono-dinitrile, succino-dinitrile, adipo-dinitrile, beta-ethoxy propionitrile, beta-ethylmercapto propionitrile, dimethylamino acetonitrile, 3-formylamino propionitrile, 1-cyanobutanone-(3), succinic acid diamide, adipic acid diamide, 1-cyano-3-methylaminopropanone-(3), acetylamino acetonitrile, malonic acid di-N.N'-methylamide, thiodipropionitrile or levulinic acid nitrile. The said bidentate complex-forming compounds are superior in their activating action to compounds which contain only one active group, as for example an acid amide or nitrile group.

Among the nickel halides, the bromides and iodides are especially suitable, but the chlorides may also be used.

The complex salts can be prepared in a very simple way for example by common heating of the components or by vigorous mixing for example by shaking concentrated aqueous nickel halide solutions with one or more of the said organic complex-forming compounds. The complex salts are in general strongly coloured green to blue crystalline compounds which usually contain two to three molecules of the organic complex-forming compound for one molecule of the metal halide. To carry out the process, instead of the complex compounds themselves, there may also be used their solutions, for example in the initial materials or in suitable organic solvents, such as hydrocarbons, ethers or ketones. In most cases it is not necessary to use the finished complex compound itself, but there may also be added to the initial mixture the components forming the complex compounds either as such or in solution. The organic complex-forming compounds may also be used in admixture with each other. Mixtures of nickel bromide and nickel iodide are also suitable. It is not necessary to add the components, necessary for the formation of the complex compounds, in the exact stoichiometric amounts. On the contrary the amounts of the components can vary within wide limits, for example the ratio of nickel halides to complex-forming organic compounds can lie between 1:20 and 20:1. In general 0.05 to 3% of nickel halide and 0.5 to 1% of the complex-forming compound are used with reference to the weight of the reaction mixture.

The conditions for the carrying out of the reaction correspond to those which are usual for the synthesis of acrylic acid according to W. Reppe. Operation is at temperatures between 175° and 200° C. and at pressures of 5 to about 100 atmospheres. The reaction can be carried out for example by introducing the catalyst and the alcohol or water, if desired with the addition of an inert solvent, into a pressure-tight vessel and then introducing into the vessel such amounts of acetylene and carbon monoxide at ordinary or moderately elevated temperature that upon subsequent heating to the reaction temperature the desired working pressure is not exceeded. The pressure can be regulated by subsequent pressing in. As the acetylene is used up in the reaction, the pressure falls so that it must be re-formed by forcing in acetylene continuously or at intervals. Carbon monoxide and acetylene are preferably used in the same proportions by volume, but the volumetric ratio can be varied according to the circumstances, for example in a ratio of CO:C$_2$H$_2$=5:1 to 1:5. The gases may be forced into the vessel consecutively or simultaneously in admixture. It is not necessary that the carbon monoxide should be pure. For example it may contain extraneous gases such as nitrogen, carbon dioxide or hydrogen. Instead of acetylene it is also possible to use gases containing acetylene. Tetrahydrofurane, acetone, dimethylformamide, N-methylpyrollidone or butyrolactam are suitable as inert solvents, i.e. solvents which render possible an increase in the concentration of acetylene and carbon monoxide in the reaction liquid.

It is a special advantage of the use of the catalysts according to this invention that only very small amounts of nickel halide need be used. A further advantage, especially in the synthesis of ethyl acrylate, is that higher concentrations of ester in the resultant reaction mixture are obtained than hitherto because fewer byproducts are formed.

The following examples will further illustrate this invention but the invention is not restricted to these examples. The parts specified in the examples are parts by weight unless it is expressly stated to the contrary.

*Example 1*

2.4 grams of the green complex salt $NiBr_2:2$-adipo-dinitrile are dissolved in 77.6 grams of ethanol in a 0.25 litre stainless steel shaking autoclave. After the air has been expelled from the autoclave with nitrogen, the solution is reacted with a mixture of acetylene and carbon monoxide (volumetric ratio 1:1) under 45 atmospheres' pressure and at 185° C. The pressure, which falls in the course of the reaction is adjusted to 45 atmospheres at half-hourly intervals by forcing in a mixture of acetylene and carbon monoxide. After 12 hours, 203 atmospheres, i.e. 34 grams, of gas mixture have been absorbed. From the reaction mixture there are obtained by distillation 103 grams of a 67% ethyl acrylate in ethanol and 11 grams of residue.

*Example 2*

1.2 parts of a 50% $NiBr_2$ solution in ethanol and 0.6 part of succino-dinitrile are added to 78.2 parts of ethanol. By reaction as in Example 1, 106 parts of a reaction mixture are obtained from which by distillation there are obtained by distillation 94 parts of a 54% ethyl acrylate in ethanol and also 12 parts of a residue.

*Example 3*

1.2 parts of a 50% $NiBr_2$ solution in ethanol and 0.5 part of acetoamino-acetonitrile are added to 78.3 parts of ethanol. After reaction as in Example 1 there are obtained 124 parts of product from which by distillation 113 parts of a 52% ethyl acrylate and 11 parts of residue are obtained.

*Example 4*

By working as in Example 3 but with 0.7 part of acetoamino-propionitrile instead of 0.5 part of aceto-amino-acetonitrile, 106 parts of a 42% ethyl acrylate and 9 parts of residue are obtained.

*Example 5*

2.4 parts of a 50% $NiBr_2$ solution in ethanol and 1.2 parts of beta-ethoxy-propionitrile are added to 76.4 parts of ethanol. After reaction as in Example 1 there are obtained 98 parts of a reaction mixture from which by distillation 89 parts of a 45% ethyl acrylate and 9 parts of a residue are obtained.

*Example 6*

1.2 parts of a 50% $NiBr_2$ solution in normal butanol and 0.5 part of malono-dinitrile are added to 78.3 parts of normal butanol and reacted at 185° C. as in Example 1 but at only 28 atmospheres. 102 parts of a reaction product are obtained from which by distillation 92 parts of a 51% butyl acrylate are recovered, besides 8.5 parts of a residue.

*Example 7*

By using 1 part of levulonitrile as activator instead of malonodinitrile in Example 6, 91 parts of a distillate containing 48% of butyl acrylate are obtained.

*Example 8*

By using 0.8 part of beta ethylmercapto-propionitrile as activator in Example 6 instead of malono-dinitrile, 100 parts of a distillate containing 58% of butyl acrylate are obtained.

*Example 9*

By using 0.6 part of succino-dinitrile in Example 6 instead of malono-dinitrile, 104 parts of a distillate containing 56% of butyl acrylate are obtained.

*Example 10*

2.4 parts of the complex salt $NiBr_2:2$-adipo-dinitrile are dissolved in 77.6 parts of methanol. After reaction as in Example 1, 99 parts of a reaction product are formed from which, besides 9 parts of a residue, there are obtained by distillation 91 parts of 37% methyl acrylate in methanol.

*Example 11*

A mixture of acetylene and carbon monoxide in the ratio by volume 1:1 is pressed at 185° C. and a pressure of 45 atmospheres into a solution of 70 parts of tetrahydrofurane, 8 parts of water, 1.2 parts of 50% aqueous $NiBr_2$ solution and 0.5 part of beta-ethylmercapto-propionitrile. The pressure is adjusted at half-hourly intervals by forcing in a mixture of acetylene and carbon monoxide at 45 atmospheres. After 12 hours, the total fall in pressure amounts to 104 atmospheres, i.e. 35.3 grams of gas mixture. 115 parts of a reaction mixture are obtained from which 28.7 parts of 100% acrylic acid are distilled off.

*Example 12*

79 parts of normal butanol, 1 part of nickel iodide, 0.7 part of adipo-dinitrile are reacted as described in Example 1 at 175° C. and 28 atmospheres with a mixture of acetylene and carbon monoxide in the ratio 1:1. 109 parts of a reaction product are obtained from which by distillation at a pressure of 20 Torr there are obtained 99 parts of a 53% butyl acrylate as well as 10 parts of a brown viscous oil.

We claim:

1. In a process for the production of an acrylic compound by reacting acetylene, carbon monoxide and a member selected from the group consisting of water and lower alkanols in the presence of a catalyst at a temperature between 100° C. and 250° C. and under a pressure of about 5 to 100 atmospheres, the improvement which comprises carrying out said reaction in the presence of a complex catalyst which contains a nickel halide selected from the group consisting of nickel chloride, nickel bromide and nickel iodide, and a complex-forming organic compound having the general formula $$X-CH_2-(CH_2)_n-Y$$

wherein X represents a member of the class consisting of nitrile, imino ether, and acid amide groups, Y represents a member of the class consisting of nitrile, imino ether, acid amide, hydroxy, alkoxy, acyl, thioether and secondary amino groups, and $n$ is a whole number of from 0 to 5, inclusive.

2. A process as claimed in claim 1 wherein the complex nickel catalyst is allowed to form during the reaction by the addition of the components to the initial mixture.

3. A process as claimed in claim 1 wherein nickel bromide is used as nickel halide.

4. A process as claimed in claim 1 wherein nickel iodide is used as nickel halide.

5. A process as claimed in claim 1 wherein adipo-dinitrile is used as the organic complex-forming compound.

6. A process as claimed in claim 1 wherein succino-dinitrile is used as the organic complex-forming compound.

7. A process as claimed in claim 1 wherein aceto-amino-acetonitrile is used as the organic complex-forming compound.

8. A process as claimed in claim 1 wherein beta-ethoxypropionitrile is used as the organic complex-forming compound.

References Cited in the file of this patent

UNITED STATES PATENTS 2,738,364    Reppe et al.  ------------ Mar. 13, 1956

FOREIGN PATENTS 854,948    Germany ---------------- Nov. 10, 1952
1,117,188   France ------------------ Feb. 20, 1956

OTHER REFERENCES

Copenhaver et al.: "Acetylene and Carbon Monoxide Chemistry" (1949), p. 259–65, 297–8.

Merck Index, 6th edition (1952), p. 10.